(12) United States Patent
Heidari-Bateni et al.

(10) Patent No.: US 7,912,033 B2
(45) Date of Patent: Mar. 22, 2011

(54) DEVICE SYNCHRONIZATION ON A COMMUNICATION NETWORK

(75) Inventors: Ghobad Heidari-Bateni, San Diego, CA (US); Stanislaw Czaja, Cardiff, CA (US)

(73) Assignee: Olympus Corporation, Hachioji-Shi, Tokyo (JP)

( * ) Notice: Subject to any disclaimer, the term of this patent is extended or adjusted under 35 U.S.C. 154(b) by 1388 days.

(21) Appl. No.: 11/325,763

(22) Filed: Jan. 4, 2006

(65) Prior Publication Data
US 2006/0268891 A1 Nov. 30, 2006

Related U.S. Application Data

(60) Provisional application No. 60/686,130, filed on May 31, 2005.

(51) Int. Cl.
*H04J 3/06* (2006.01)
*G08C 17/00* (2006.01)

(52) U.S. Cl. ........ 370/350; 370/311; 370/324; 370/503; 370/510; 370/512

(58) Field of Classification Search ............... 370/350, 370/311, 324, 298, 503, 509, 510, 512
See application file for complete search history.

(56) References Cited

U.S. PATENT DOCUMENTS

| | | | |
|---|---|---|---|
| 5,953,323 A * | 9/1999 | Haartsen | 370/330 |
| 6,002,708 A | 12/1999 | Fleming et al. | |
| 6,434,361 B1 * | 8/2002 | Carrozza et al. | 455/13.2 |
| 6,788,924 B1 * | 9/2004 | Knutson et al. | 455/265 |
| 6,795,425 B1 * | 9/2004 | Raith | 370/321 |
| 2004/0100957 A1 * | 5/2004 | Huang et al. | 370/390 |
| 2005/0043027 A1 | 2/2005 | Emeott et al. | |

(Continued)

FOREIGN PATENT DOCUMENTS

EP 0680162 4/1995

(Continued)

OTHER PUBLICATIONS

Aiello et al., "Time to Market Pervasiveness—Multiband OFDM Products," MBOA Multiband OFDM Alliance SIG, Sep. 13, 2004, available at http://www.wimedia.org/en/resources/mboa_archives.asp.

(Continued)

*Primary Examiner* — Huy Phan
(74) *Attorney, Agent, or Firm* — Sheppard Mullin Richter & Hampton LLP

(57) ABSTRACT

A method to enable scheduling communications activities for an electronic communication device configured to communicate across a communication network is provided. The method comprises the steps of scheduling a communication activity during a scheduling window such that the communication activity is scheduled to occur toward the end of a communication window; entering a power-save mode after the scheduling step; and transitioning from the power-save mode prior to the scheduled communication activity. In one embodiment the method can further include a step of conducting the scheduled communication activity and transitioning back to the power-save mode after a next communication activity is scheduled or be implemented to allow the step of conducting the scheduled communication activity and transitioning back to the power-save mode at the end of the next communication window. In one embodiment the transitioning step comprises the steps of awakening from the power-save mode and synchronizing with the communication network, wherein synchronizing can comprise the step of synchronizing with electronic communication device associated with the communication network.

33 Claims, 4 Drawing Sheets

U.S. PATENT DOCUMENTS

| | | | |
|---|---|---|---|
| 2005/0059436 A1 | 3/2005 | Addy et al. | |
| 2005/0094642 A1 | 5/2005 | Rogers | |
| 2005/0113151 A1 | 5/2005 | Burke et al. | |
| 2005/0124313 A1 | 6/2005 | Simpson et al. | |
| 2005/0135302 A1* | 6/2005 | Wang et al. | 370/329 |
| 2005/0237964 A1* | 10/2005 | Kupershmidt | 370/321 |
| 2008/0259895 A1* | 10/2008 | Habetha et al. | 370/345 |
| 2010/0020803 A1* | 1/2010 | Nishihara | 370/395.1 |

FOREIGN PATENT DOCUMENTS

| | | |
|---|---|---|
| EP | 1227602 | 1/2001 |
| WO | WO 03096580 | 11/2003 |

OTHER PUBLICATIONS

Aiello et al., Multiband OFDM Physical Layer Specification, Release 1.0, Apr. 27, 2005.
Barr, "TG3 WiMedia Presentation to PC," Project: IEEE 802.15 Working Group for Wireless Personal Area Networks (WPANS), Nov. 11, 2002.
Batra et al., "Multiband OFDM Physical Layer Proposal for IEEE 802.15 Task Group 3a," MBOA-SIG Multiband OFDM Alliance SIG, Sep. 14, 2004.
Batra et al., "What is Really Fundamental?" MBOA Multiband OFDM Alliance SIG, Sep. 12, 2004, available at http://www.wimedia.org/en/resources/mboa_archives.asp.
Filauro, "Radio Control Interface for Host Wire Adapter," (2004).
Foerster, "State of International UWB Regulation in ITU," MBOA Multiband OFDM Alliance SIG, Sep. 14, 2004, available at http://www.wimedia.org/en/resources/mboa_archives.asp.
Froelich, "WiMedia Convergence Architecture," (2004).
Huang and Fidler, "Market Needs for a High Speed WPAN Specification," MBOA Multiband OFDM Alliance SIG, Sep. 14, 2004, available at http://www.wimedia.org/en/resources/mboa_archives.asp.
Intel, "Ultra-Wideband (UWB) Technology: Enabling High-speed Wireless Personal Area Networks," White Paper (2004).
Leeper et al., "Spectral Sculpting and a Future-Ready UWB," MBOA Multiband OFDM Alliance SIG, Sep. 14, 2004, available at http://www.wimedia.org/en/resources/mboa_archives.asp.
MBOA, "Ultrawideband: High-speed, Short-range technology with Far-reaching Effects,"MBOA-SIG White Paper, Sep. 1, 2004.
McCrady et al., "Mobile Ranging With Low Accuracy Cloaks" IEEE (1999) 85-88.
Patwari et al., IEEE Transactions on Signal Processing (2003) 51(8):2137-2148.
Ranta, "MB-OFDM for Mobile Handsets," MBOA Multiband OFDM Alliance SIG, Sep. 13, 2004, available at http://www.wimedia.org/en/resources/mboa_archives.asp.
Razzell, "In-band Interference Properties of MB-OFDM," MBOA Multiband OFDM Alliance SIG, Sep. 4, 2004, available at http://www.wimedia.org/en/resources/mboa_archives.asp.
Razzell et al., "CCA Algorithm Proposal For MB-OFDM," MBOA Multiband OFDM Alliance SIG, Sep. 4, 2004, available at http://www.wimedia.org/en/resources/mboa_archives.asp.
Rosser, "Wireless Broadband: UWB Standards and Regulatory Update," Staccato Communications (2004).
Shoemake, "Multiband OFDM Update and Overview," MBOA Multiband OFDM Alliance SIG, Sep. 12, 2004.
Solomon et al., "Ultrawideband: A World Without Cables," CEA Webcast, Sep. 22, 2004, MBOA Multiband OFDM Alliance SIG, available at http://www.wimedia.org/en/resources/mboa_archives.asp.
Steggles et al., "Local positioning systems: New possibilities for urban combat training," presented at IITSEC 2003, December.
Taylor and Fleming, "Relationship of WUSB and other WiMedia\MBOA Specifications," (2004).
Taylor, (ed.) Technical Specification: MBOA MAC-PHY Interface, May 27, 2004.
Zheng and Lee, IEEE Communications Magazine (2004) Jun. 140-146.
Wen-Tsuen Chen, "An Efficient QoS Guaranteed MAC Protocol in Wireless ATM Networks," Information Networking (2001), 785-792.
Hao Zhu and Guohong Cao, "A Power-Aware and QoS-Aware Service Model on Wireless Networks," INFOCOM, (2004), 1393-1403.

\* cited by examiner

DEVICE SYNCHRONIZATION ON A COMMUNICATION NETWORK

CROSS REFERENCE TO RELATED APPLICATIONS

This application claims priority to U.S. Patent Provisional Application Ser. No. 60/686,130, filed on May 31, 2005, by Ghobad Heidari-Bateni, et al., the entirety of which is incorporated by reference herein.

FIELD OF THE INVENTION

The present invention relates generally to communication channels, and more particularly to a system and method for coordinating communications activities on a communications channel.

BACKGROUND OF THE INVENTION

With the many continued advancements in communications technology, more and more devices are being introduced in both the consumer and commercial sectors with advanced communications capabilities. Additionally, advances in processing power and low-power consumption technologies, as well as advances in data coding techniques have led to the proliferation of wired and wireless communications capabilities on a more widespread basis.

For example, communication networks, both wired and wireless, are now commonplace in many home and office environments. Such networks allow various heretofore independent devices to share data and other information to enhance productivity or simply to improve their convenience to the user. One such communication network that is gaining widespread popularity is an exemplary implementation of a wireless network such as that specified by the WiMedia-MBOA (Multiband OFDM Alliance). Other exemplary networks include the Bluetooth® communications network and various IEEE standards-based networks such as 802.11 and 802.16 communications networks.

Architects of these and other networks, and indeed communications channels in general, have long struggled with the challenge of managing multiple communications across a limited channel. For example, in some environments, more than one device may share a common carrier channel and thus run the risk of encountering a communication conflict between the one or more devices on the channel.

Over the years, network architects have come up with various solutions to arbitrate disputes or otherwise delegate bandwidth among the various communicating devices, or clients, on the network. Schemes used in well known network configurations such as token rings, Ethernet, and other configurations have been developed to allow sharing of the available bandwidth. In addition to these schemes, other techniques have been employed, including for example CDMA (code division multiple access) and TDMA (time division multiple access) for cellular networks.

FDM (Frequency Division Multiplexing) is a technology that enables multiple devices to transmit their signals simultaneously over a communication channel in a wired or wireless setting. The devices' respective signals travel within their designated frequency band (carrier), onto which the data (text, voice, video, or other data.) is modulated. With adequate separation in frequency band spacing, multiple devices can simultaneously communicate across the same communication channel (network or point-to-point).

Orthogonal FDM (OFDM) spread spectrum systems distribute the data over a plurality of carriers that are spaced apart at precise frequencies. The spacing is chosen so as to provide orthogonality among the carriers. Thus, a receiver's demodulator recovers the modulated data with little interference from the other carrier signals. The benefits of OFDM are high spectral efficiency, resiliency to RF interference, and lower multi-path distortion or inter symbol interference (ISI). OFDM systems can be combined with other techniques (such as time-division multiplexing) to allow sharing of the individual carriers by multiple devices as well, thus adding another dimension of multiplexing capability.

BRIEF SUMMARY OF THE INVENTION

According to one embodiment of the invention a method is provided to enable scheduling communications activities for an electronic communication device configured to communicate across a communication network. The method comprises the steps of scheduling a communication activity during a scheduling window such that the communication activity is scheduled to occur toward the end of a communication window; entering a power-save mode after the scheduling step; and transitioning from the power-save mode prior to the scheduled communication activity. In one embodiment the method can further include a step of conducting the scheduled communication activity and transitioning back to the power-save mode after a next communication activity is scheduled or be implemented to allow the step of conducting the scheduled communication activity and transitioning back to the power-save mode at the end of the next communication window. In one embodiment the transitioning step comprises the steps of awakening from the power-save mode and synchronizing with the communication network, wherein synchronizing can comprise the step of synchronizing with electronic communication device associated with the communication network.

In one embodiment the power-save mode is at least one of a sleep mode and a deep-sleep mode, the scheduling window is a beacon period, and the communication window and beacon period comprise a superframe.

In one embodiment the step of scheduling is performed by a first electronic communication device associated with the communication network and includes a step of scheduling a synchronization period for synchronization with the communication network, and the method further comprises the steps of: the first electronic communication device requesting assistance in synchronization from a second electronic communication device associated with the communication network, and the first electronic communication device relinquishing the scheduled synchronization period to the second electronic communication device to communicate information used for resynchronization. In one embodiment, the second electronic communication device requests that the first electronic communication device relinquish one or more slots associated with the synchronization period. In a further embodiment, the synchronization period and the communication activity can be scheduled in successive time slots. Additionally, the first and second electronic communication devices can use a distributed reservation protocol reservation to coordinate their slots.

According to yet another embodiment, the step of scheduling is performed by a first electronic communication device associated with the communication network and further comprises the step of scheduling a synchronization period for synchronization, and the method further comprises the step of the first electronic communication device requesting assistance in resynchronization from a second electronic communication device associated with the communication network, wherein the second electronic communication device requests access during the synchronization period and transmits dummy frames during the synchronization period to assist in synchronization.

According to a further embodiment the step of scheduling can be performed by a first electronic communication device associated with the communication network and the scheduled period includes time at the beginning of the period for assisting a second electronic communication device with resynchronization. In one implementation, the first and second electronic communication devices communicate regarding resynchronization through private handshaking.

In yet another embodiment of the invention, an electronic communication device configured for communication across a communication network comprises communication control logic configured to provide communication across the communication network; scheduling control logic configured to schedule the communication across the communication network, wherein the scheduling control logic is configured to schedule the communication at the end of a communication window; power control logic configured to cause the electronic communication device to enter a power-save mode after the communication is scheduled and to transition from the power-save mode prior to the scheduled communication activity. In certain implementations, the electronic communication device control logic comprises at least one of hardware, software and a combination of hardware and software. Additionally, the scheduling control logic can be configured to conduct the scheduled communication activity and transition back to the power-save mode after a next communication activity is scheduled. The scheduling control logic can also be configured to conduct the scheduled communication activity and transition back to the power-save mode at the end of the next communication window.

In one embodiment the power control logic is configured to transition the electronic communication device from the power-save mode and synchronize the electronic communication device with the communication network. According to yet another embodiment the scheduling control logic is further configured to schedule a synchronization period for synchronization with the communication network, request assistance in synchronization from a second electronic communication device associated with the communication network, and relinquish the scheduled synchronization period to the second electronic communication device to communicate information used for resynchronization. In one embodiment, the second electronic communication device requests that the first electronic communication device relinquish one or more slots associated with the synchronization period. Additionally, the scheduling control logic can be configured to schedule a synchronization period for synchronization with the communication network, request assistance in resynchronization from a second electronic communication device associated with the communication network, and receive dummy frames from the second electronic communication device during the synchronization period to assist in synchronization.

In yet another embodiment of the invention, an electronic communication device configured for communication across a communication network comprises means for communicating with at least one other electronic communication device across the communication network; means for scheduling the communication across the communication network at the end of a communication window; means for entering a power-save mode after the communication is scheduled and for transitioning from the power-save mode prior to the scheduled communication activity.

In still another embodiment, a distributed wireless communication network uses a method of scheduling a communication activity for an electronic communication device associated with the network, the network temporally organized into superframes for network activities, a superframe comprises a beacon period and a plurality of media access slots, the method comprising the steps of first electronic communication device scheduling a network communication activity for a superframe, the scheduling occurring during the beacon period associated with that superframe, wherein the communication activity is scheduled to occur in one or more media access slots at or near the end of that superframe; the first electronic communication device entering a power-save mode after the communication activity is scheduled; and the first electronic communication device remaining in the power-save mode until prior to the scheduled communication activity. In one embodiment, the step of scheduling includes a step of scheduling one or more media access slots prior to the scheduled communication activity for synchronization of the first electronic communication device with the communication network, and the method further comprises the steps of: the first electronic communication device requesting assistance in synchronization from a second electronic communication device associated with the communication network, and the first electronic communication device, upon the request of the second communication device, relinquishing the scheduled synchronization slots to the second electronic communication device to communicate information used for synchronization. In one embodiment, the synchronization period and the communication activity are scheduled in successive media access slots, the first and second electronic communication devices use a distributed reservation protocol reservation to coordinate their slots.

In yet another embodiment, scheduling further comprises the steps of scheduling a synchronization period of one or more media access slots, and requesting assistance in resynchronization from the second electronic communication device. In this embodiment, the second electronic communication device requests that the first electronic communication device relinquish one or more slots associated with the synchronization period and transmits dummy frames during the relinquished slots.

In one embodiment a distributed wireless communication network schedules a communication activity for an electronic communication device associated with the network, the network temporally organized into superframes for network activities, a superframe comprises a beacon period and a plurality of media access slots, the scheduling comprises a first electronic communication device reserving a network communication activity time slot comprises one or more media access slots during a superframe, the reservation made on behalf of a second electronic communication device, the first electronic communication device communicating information regarding the reservation to the second electronic communication device; and the reservation including a reservation of one or more additional media access slots for device synchronization. The reservation can be communicated through handshaking between the first and second electronic communication devices.

Further features and advantages of the present invention, as well as the structure and operation of various embodiments of the present invention, are described in detail below with reference to the accompanying drawings.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

DESCRIPTION OF THE PREFERRED EMBODIMENTS

Figure 1:
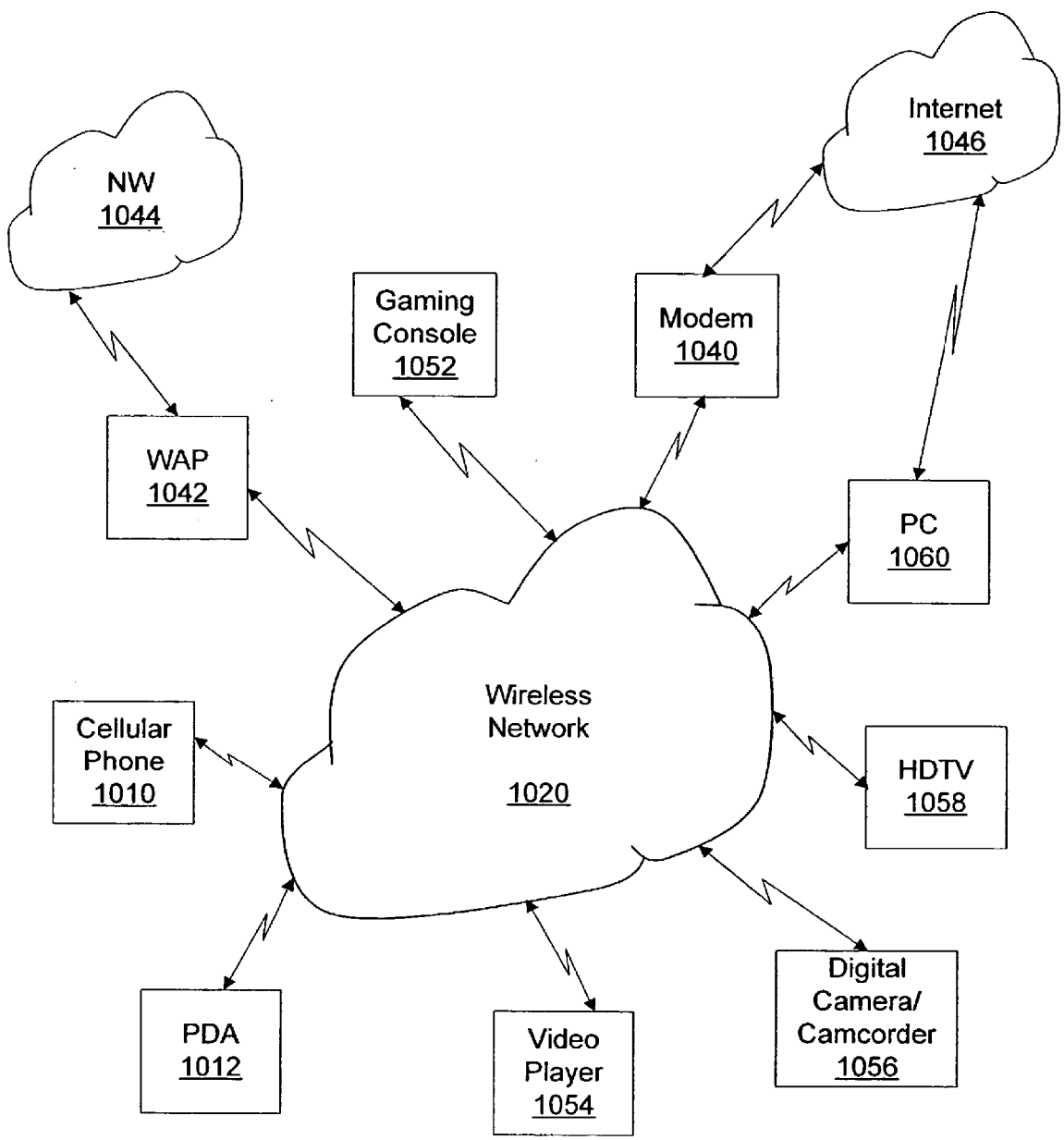
FIG. 1 is a block diagram illustrating one possible configuration of a wireless network that can serve as an example environment in which the present invention can be implemented.

The present invention is directed toward a system and method for providing improved communication efficiency and device synchronization on a communication channel. The communication channel can be that of a communication network or other communication channel. One example communication channel is a wireless network. An exemplary implementation of a wireless network is a network as specified by the WiMedia-MBOA (Multiband OFDM Alliance), although the invention can be implemented with other networks as well. In one embodiment, the present invention is directed toward scheduling communication activities is in close temporal proximity to other activities for a given device, so as to reduce that device's wake-up time and the frequency of awakenings.

Before describing the invention in detail, it is useful to describe an example environment in which the invention can be implemented. One such example is a wireless beaconing network in which multiple electronic devices (for example, computers and computing devices, cellular telephones, personal digital assistants, motion and still cameras, among others) can communicate and share data, content and other information with one another. One example of such a network is that specified by the WiMedia standard (within WiMedia and Multi-Band OFDM Alliance). From time-to-time, the present invention is described herein in terms of a distributed network or in terms of the WiMedia standard. Description in terms of these environments is provided to allow the various features and embodiments of the invention to be portrayed in the context of an exemplary application. After reading this description, it will become apparent to one of ordinary skill in the art how the invention can be implemented in different and alternative environments. Indeed, applicability of the invention is not limited to a distributed wireless network, nor is it limited to the MB-UWB standard described as one implementation of the example environment.

Most network standards specify policies or rules that govern the behavior of network connected devices. The WiMedia standard specifies the mechanism and policies that are to be followed by W-USB and WiNet compliant devices in order to allow for an ad hoc and distributed network of such devices to operate efficiently.

In most distributed networks, the network of the devices is maintained by requiring all devices to announce parameters such as their presence, their capabilities and their intentions for reserving transmission slots and so on. For example, with the WiMedia standard, this can be done during what are referred to as beacon period time slots. According to this standard, devices joining the network are expected to monitor the beacon period to learn about the network status and parameters before attempting to use the network. In other network configurations, beacon periods are similarly used to allow management of network devices as described more fully below. Thus, beacon periods are one form of window or network period during which scheduling or other housekeeping activities can be conducted. Beacon periods in the above-referenced standard, and other time periods used for scheduling or other housekeeping chores in other network configurations, are generally referred to as scheduling windows.

Devices are typically allowed to enter a power save mode to conserve power and possibly prolong operation. For example, battery operated devices may enter a sleep mode or even a deep-sleep mode, wherein one or more of their functions are diminished or shut down in order to conserve power. Depending on the environment, devices may be allowed to enter into a sleep mode for short or long periods of time. For example, a sleep mode can be an energy-saving mode of operation in which some or all components are shut down or their operation limited. Many battery-operated devices, such as notebook computers, cell phones, and other portable electronic devices support one or more levels of a sleep mode. For example, when a notebook computer goes into one level of sleep mode, it may turn off the hard drive and still allow the user to perform operations, only powering up the hard drive when access is needed. In a deeper level of sleep, the computer may further turn off the display. In yet a further level of sleep, the computer may enter a hibernate state. Likewise, other electronic devices communicating across a communication channel may have similar sleep states and may power down unnecessary or unused components, including an RF transceiver, depending on a number of factors such as elapsed time, activities and so on. As described below, in accordance with one embodiment, devices may be prompted to enter a sleep mode upon completion of scheduling or other housekeeping activities and be configured to awaken for scheduled activities such as, for example, communication activities.

FIG. 1 is a block diagram illustrating one possible configuration of a wireless network that can serve as an example environment in which the present invention can be implemented. Referring now to FIG. 1, a wireless network 1020 is provided to allow a plurality of electronic devices to communicate with one another without the need for wires or cables between the devices. A wireless network 1020 can vary in coverage area depending on a number of factors or parameters including, for example, the transmit power levels and receive sensitivities of the various electronic devices associated with the network. Examples of wireless networks can include the various IEEE and other standards as described above, as well as other wireless network implementations.

With many applications, the wireless network 1020 operates in a relatively confined area, such as, for example, a home or an office. The example illustrated in FIG. 1 is an example of an implementation such as that which may be found in a home or small office environment. Of course wireless communication networks and communication networks in general are found in many environments outside the home and office as well. In the example illustrated in FIG. 1, wireless network 1020 includes a communication device to allow it to communicate with external networks. More particularly, in the illustrated example, wireless network 1020 includes a modem 1040 to provide connectivity to an external network such as the Internet 1046, and a wireless access point 1042 that can provide external connectivity to another network 1044.

Also illustrated in the example wireless network 1020 are portable electronic devices such as a cellular telephone 1010 and a personal digital assistant (PDA) 1012. Like the other electronic devices illustrated in FIG. 1, cellular telephone 1010 and PDA 1012 can communicate with wireless network 1020 via the appropriate wireless interface. Additionally, these devices may be configured to further communicate with an external network. For example, cellular telephone 1010 is typically configured to communicate with a wide area wireless network by way of a base station.

Additionally, the example environment illustrated in FIG. 1 also includes examples of home entertainment devices connected to wireless network 1020. In the illustrated example, electronic devices such as a gaming console 1052, a video player 1054, a digital camera/camcorder 1056, and a high definition television 1058 are illustrated as being interconnected via wireless network 1020. For example, a digital camera or camcorder 1056 can be utilized by a user to capture one or more still picture or motion video images. The captured images can be stored in a local memory or storage device associated with digital camera or camcorder 1056 and ultimately communicated to another electronic device via wireless network 1020. For example, the user may wish to provide a digital video stream to a high definition television set 1058 associated with wireless network 1020. As another example, the user may wish to upload one or more images from digital camera 1056 to his or her personal computer 1060 or to the Internet 1046. This can be accomplished by wireless network 1020. Of course, wireless network 1020 can be utilized to provide data, content, and other information sharing on a peer-to-peer or other basis, as the provided examples serve to illustrate.

Also illustrated is a personal computer 1060 or other computing device connected to wireless network 1020 via a wireless air interface. As depicted in the illustrated example, personal computer 1060 can also provide connectivity to an external network such as the Internet 1046.

In the illustrated example, wireless network 1020 is implemented so as to provide wireless connectivity to the various electronic devices associated therewith. Wireless network 1020 allows these devices to share data, content, and other information with one another across wireless network 1020. Typically, in such an environment, the electronic devices would have the appropriate transmitter, receiver, or transceiver to allow communication via the air interface with other devices associated with wireless network 1020. These electronic devices may conform to one or more appropriate wireless standards and, in fact, multiple standards may be in play within a given neighborhood. Electronic devices associated with the network typically also have control logic configured to manage communications across the network and to manage the operational functionality of the electronic device. Such control logic can be implemented using hardware, software, or a combination thereof. For example, one or more processors, ASICs, PLAs, and other logic devices or components can be included with the device to implement the desired features and functionality. Additionally, memory or other data and information storage capacity can be included to facilitate operation of the device and communication across the network.

Although a specific example implementation is illustrated in FIG. 1, it will be apparent to one of ordinary skill in the art after reading this description how other wireless networks with alternative configurations of electronic devices can be configured in accordance with this environment.

Electronic devices operating as a part of wireless network 1020 are sometimes referred to herein as network devices, members or member devices of the network or devices associated with the network. In one embodiment devices that communicate with a given network may be members or merely in communication with the network.

Having thus described an example environment in which the invention can be implemented, various features and embodiments of the invention are now described in further detail. Description may be provided in terms of this example environment for ease of discussion and understanding only. After reading the description herein, it will become apparent to one of ordinary skill in the art that the present invention can be implemented in any of a number of different communication environments (including wired or wireless communication environments, and distributed or non-distributed networks) operating with any of a number of different electronic devices.

Figure 2:
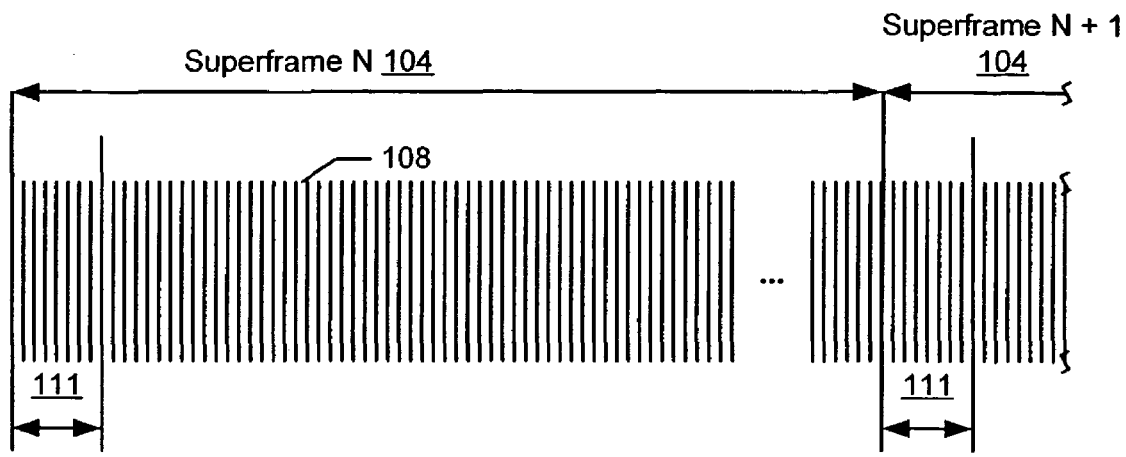
FIG. 2 is a diagram illustrating an example frame configuration for one network environment in which the present invention can be implemented.

Some communication networks are divided into periods or frames that can be used for communication and other activities. For example, as discussed above, some networks have a scheduling window such as, for example, a beacon period, for scheduling upcoming communication activities. Also, some networks have a communication window during which such communication activities take place. In the WiMedia-MBOA standard, the bandwidth is divided into superframes, which in turn are divided into time slots for the transmission and reception of data by the various electronic devices associated with the network. An example of such time slots are illustrated in FIG. 2. Referring now to FIG. 2, in this exemplary embodiment, the communication bandwidth is divided into superframes 104 (two illustrated), each superframe 104 itself being divided into a plurality of timeslots referred to as Media Access Slots 108. In the example environment, there are 256 media access slots 108 in each superframe 104, although other allocations are possible. Additionally, at the beginning of each superframe 104 is a beacon period 111, which is comprised of a plurality of beaconing slots. In some networks, the beacon period 111 is a period during-which devices reserve timeslots and exchange other housekeeping or status information. For example, in the WiMedia-MBOA distributed wireless network, the superframes comprise a beacon period 111, during which devices are awake and receive beacons from other devices. Superframes in the above-referenced standard, and other time periods used for communications among devices in other network configurations, with or without scheduling windows, are generally referred to herein as communication windows. As noted above, for clarity of description the present invention is described in terms of the example environment, and thus is at times described using the terms superframe and beacon period. As would be apparent to one of ordinary skill in the art after reading this description, the invention applies to other communication formats, including the more general case utilizing scheduling windows and communication windows. Additionally, the invention is not limited to applications where the bandwidth is divided into frames or windows, but can be generally applied to communication channels and networks of various protocols and configurations.

In this example network, each electronic device associated with the network can reserve certain time slots or media access slots 108 of each superframe 104 during which to transmit its data. In this example, the data is transmitted in packets and the allotted bandwidth is provided based on its Quality of Service or power conservation requirements. As such, the network load is dynamically distributed and can be changed within a superframe 104 as time progresses. As such, multiple communication intervals can be used to support things such as network optimization and defragmentation, while still allowing for power save modes.

In beaconing networks, including the example WiMedia network, network devices listen to other network devices during the beacon period 111 to determine if any action needs to be taken during the next superframe 104. Such actions might include, for example, receiving a scheduled transmission from another network device, sending information to another network device, and so on. In addition to such message scheduling, the beacon period 111 can be used to exchange other information such as availability information, operating parameters, control information and so on. For example, status information, beacon period length, beacon intervals, network security information, available carriers, can be exchanged.

With conventional solutions, associated devices normally do not go to deep sleep during any part of the superframe 104. In some networks, if a device does go to deep sleep, it wakes up at the beginning of the superframe to synchronize during the beacon period 111 and stays synchronized until its reserved time slot comes up. After that the device may go to deep sleep, waking up again during the beacon period 111 of the next superframe 104. According to this method the device awakens earlier than necessary (at least synchronized) or remains awake longer than necessary for synchronization and communication. Even if the reserved slot is the first-available (reservable) slot in the superframe, in some networks the distance, and hence amount of time, from beacon period 111 could be quite large. For example with the WiMedia-MBOA, the distance from the beacon period 111 could be up to 255 media access slots 108. This is because with the WiMedia-MBOA the first few (depending on the number of devices) media access slots 108 are not reservable, and the shortest beacon period 111 (for example, in a very small network) could be as long as one media access slot 108 in the smallest network.

For some devices such as, for example, low-power devices, battery powered devices or other power-sensitive devices, it may be desirable to minimize that device's awake time, while maintaining a media access slot 108 reservation within the superframe. Therefore, in one embodiment, the network and its devices can be configured so as to allow one or more associated devices to reserve appropriate media access slot(s) 108 for a time period that is in close temporal proximity to other network activities for that device, so as to reduce its wake-up time and the frequency of awakenings. For example, in one embodiment a device can be configured so as to schedule its communication activities close in temporal proximity to its scheduling activities so that the device can awaken, conduct its activities in a relatively short period of time and return to its power save mode until the next activity or, preferably, group of activities. As a further example, a device can be configured to schedule its communication activities at or toward the end of the superframe 104. Preferably, this is done as close as possible or practical to the beacon period 111 of the next subsequent superframe 104. This can be implemented so as to allow the device to wake up once for its reserved slot and to remain awake for the beacon period 111 of the next superframe 104 before going to sleep. After the beacon period 111, the network device can then go to sleep, in some cases during the entire remainder of the superframe 104. As another example, a device can be configured to schedule its communication activities at or toward the beginning of the superframe 104, just after the beacon period 111, allowing it to remain awake for both activities, before entering the power-save mode for the remainder of the superframe 104.

Scheduling communications as close to the end of a superframe as possible or practical allows extension of the device's sleep time accordingly. In alternative embodiments, however, the electronic device can be scheduled for communication at any time during the superframe 104, and can even be scheduled to communicate at multiple (periodic or otherwise) intervals in a superframe 104, while still availing itself of the power-save mode. For example, the device can be scheduled so as to awaken during the beacon period, establish its communication time or times. The device can then go into power-save mode and awaken for the scheduled activity. The wakening time can allow time to perform synchronization if desired. Thus, various Quality of Service and other parameters such as throughput, interval period, and the like can be achieved while allowing at least some measure of power conservation.

In one embodiment, whether a device enters a power-save mode between any given activities (scheduling, communication or otherwise), depends on the amount of time between such activities. This may depend on a number of factors including the time it takes to enter and exit a power-save mode, the relative power tradeoffs between the amount of power-save time gained versus the amount of power a device may consume in entering and exiting a power save mode, and so on.

Figure 3:
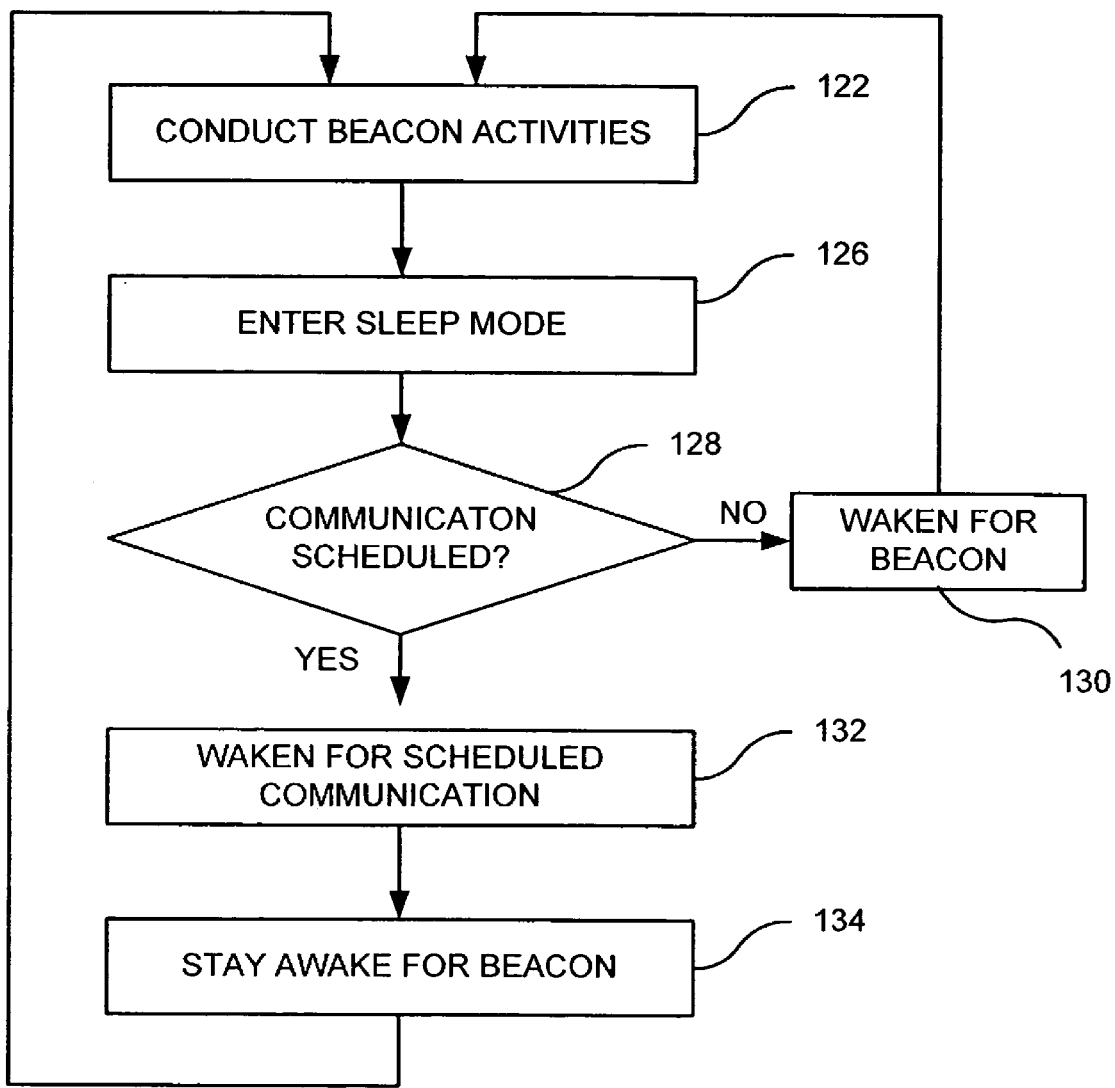
FIG. 3 is an operational flow diagram illustrating network communication in accordance with one embodiment of the invention.

FIG. 3 is an operational flow diagram illustrating an example process for entering a sleep mode and reawakening for network operations in accordance with one embodiment of the invention. Referring now to FIG. 3, in a step 122 the network device conducts beacon activities. As discussed above, beacon activities can include, for example, scheduling network communications for the upcoming superframe 104 or other network activities. Other beacon activities can be conducted as well, and in alternative implementations, coordination in other than a beacon period 111 may be conducted depending on the environment.

Network activities, if any, are scheduled for the network device during the superframe 104. In accordance with one embodiment of the invention, such activities are scheduled as close to the end of the superframe 104 as possible or practical, especially for power sensitive devices. This allows the network device to remain in a power down or sleep mode for a longer period of time as described below. In one embodiment, the determination to move a device's activities to the end of the superframe 104 can be made based solely on whether the device is a power sensitive device. For example, devices can be classified in accordance with power sensitivity, and the determination made based on such sensitivity, with the more sensitive devices allocated media access slots 108 later in the superframe 104. In other embodiments, additional factors can be considered when determining an end-of-superframe allocation for multiple network devices. For example, factors such as required number of media access slots 108, level of power sensitivity, remaining battery life, device or communication importance, and others can be combined and even weighted in an appropriate manner depending on the network architect's goals. Additionally, one or more devices can be given a superstatus label, whereby they can trump other devices for the end-of-superframe allocation.

In a step 126, the network device enters the sleep mode, typically at the end of the beacon period 111. The sleep mode can be any power-save or power down mode, including for example a low-power state and a deep-sleep state. In one embodiment, during the sleep mode network communications are disabled for that network device. As such, the network device can be awakened to enable communications for its next network operation. In one embodiment, this can be accomplished by setting a timer to awaken the device. The power-save, or sleep, modes can involve selective power down of various aspects of the device. For example, this can include turning off components like a radio (transmit or receive), baseband components, MAC, control logic, a microprocessor or controller, various interfaces, and even a master clock.

If a network activity (for example, a transmit or receive operation) is not scheduled (decision step 128), the device awakens for the next beacon period 111 as illustrated in step 130 and conducts its beacon operations again at step 122. If, on the other hand, a communication is scheduled during the superframe 104 (decision step 128), the device is awakened for its network operation as illustrated by a step 132. In one embodiment, awakening for a scheduled activity is triggered by a master timer set to awaken the device for a designated activity. Once awake, the network device can conduct its designated network activity such as, for example, synchronizing, receiving data, transmitting data and so on.

As illustrated by a step 134, in one embodiment, the network device remains awake for the next beacon period 111. Because in step 122 the network activity was scheduled near the end of superframe 104, the amount of time that the network device is awake can be less than it may otherwise be if the network activity was scheduled earlier in the superframe 104.

In some network environments, including the WiMedia-MBOA network environment, network devices waking up for network activities may desire or may be required to synchronize with the network. However, resynchronization can take time. If the device is waking up just prior to its reserved slot as described above, it may not have adequate time or ability to resynchronize first, especially where there are no other signals present at the time to which it can synchronize. Therefore the present invention can be implemented so as to allow a resynchronization period prior to the transmission or reception of operational data or information. In such environments, the network device can be scheduled to awaken in advance of its scheduled network operation to allow for such synchronization. Because resynchronization takes time, there is a tradeoff between synchronization and remaining asleep during that time to conserve battery life. Thus, in accordance with one embodiment, a system designer can make the tradeoff determination between clock accuracy and power conservation in configuring electronic devices for operation. Also, there may be communication channels (or device pairs) for which such synchronization is not necessary or only rarely needed. In these implementations, such synchronization steps can be avoided as appropriate for that channel or for those devices.

Figure 4:
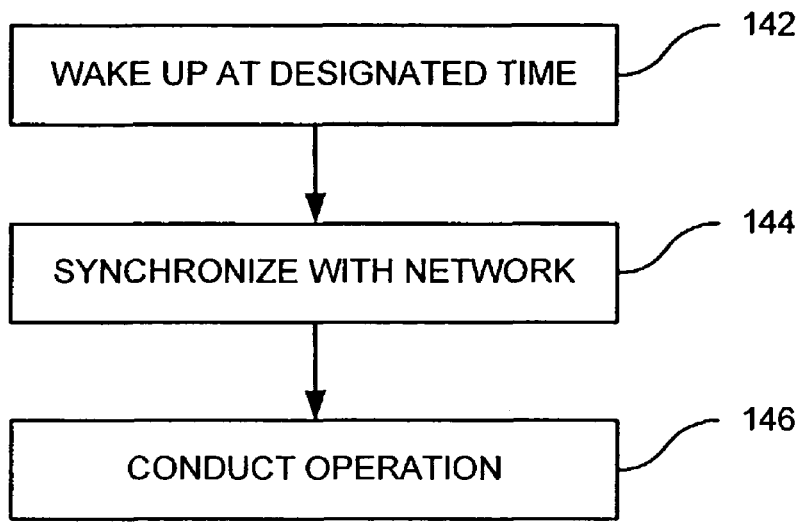
FIG. 4 is an operational flow diagram illustrating device synchronization in accordance with one embodiment of the invention.

FIG. 4 is an operational flow diagram illustrating the process of waking up and synchronizing in accordance with one embodiment of the invention. Referring now to FIG. 4, in a step 142 the network device wakes up at its designated time. In one embodiment, the designated time is set for an appropriate number of one or more media access slots 108, as determined to allow synchronization to occur. In a step 144 the synchronization takes place, preferably during the one or more advanced media access slots 108. Once properly synchronized, in a step 146, the network device can then conduct the desired operation.

In one embodiment, then, network devices can be coordinated to assist each other with the synchronization process. For example, where two devices are scheduled to communicate with one another, one device may provide signals necessary to allow the other device to synchronize with the network prior to operation. This feature is particularly useful in a situation where, for example, a power-sensitive device of interest is scheduled to communicate with a relatively power-insensitive device. For an example of a power-sensitive device communicating with a relatively power-insensitive device consider a camera or cellular telephone operating on a battery and communicating over the network to a printer or a projector plugged into an AC mains power source. In one embodiment, the plugged in power-insensitive device does not lose synchronization during the superframe 104, as it is not relying on battery power and may not be concerned with power consumption. In one embodiment, the power insensitive device may be configured to enter a sleep mode to conserve power anyway, but may be designated to not enter such a sleep mode during a superframe 104 in which it will be used to help synchronize another network device. In other embodiments, the power insensitive device may be capable of recovering synchronization through some means before the time required to communicate with the power-sensitive device.

Thus, in accordance with one embodiment of the invention, a power-sensitive device and a power-insensitive device are implemented so as to coordinate in such a way that the power-insensitive device helps the power-sensitive device to regain its synchronization. In one embodiment this is accomplished by sending certain frames (for example, dummy frames) at a time before the reserved communication slot of the power-sensitive device (for example, when the power-sensitive device wakes up and needs a signal to sync to). In one instance of this embodiment, the power-sensitive and power-insensitive devices can be configured so as to coordinate with each other, to allow the power-insensitive device to initiate the resynchronization process on behalf of the power-sensitive device. In one embodiment, the power-insensitive and power-sensitive devices can set up a mechanism in advance to coordinate their reservations such that this assisted synchronization can take place.

In accordance with one embodiment of the invention, the power-sensitive device makes a reservation of slots at the end of the superframe by counting not only its own slot(s) but also the one or more slots used by the power-insensitive device to assist with the power-sensitive device's synchronization process. For example, in one implementation the power-sensitive device requests one additional slot that can be used for the power-sensitive device's synchronization process.

Figure 5:
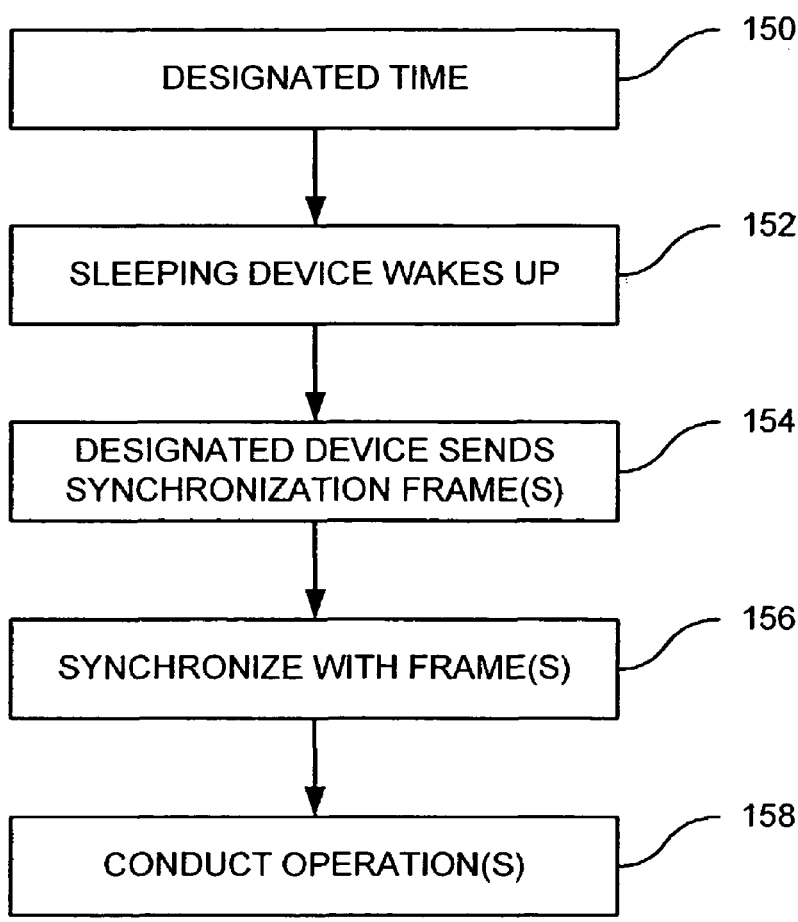
FIG. 5 is an operational flow diagram illustrating device synchronization in accordance with another embodiment of the invention.

FIG. 5 is an operational flow diagram illustrating the process of waking up and synchronizing in accordance with one embodiment of the invention. This process and other embodiments below are described in terms of the above scenario wherein a power-insensitive device assists a power sensitive device with synchronization. However, after reading this description, it will be apparent that this process can be performed by any two or more devices, without the constraint that one be power sensitive and the other be power insensitive.

Referring now to FIG. 5, in a step 150 the power insensitive device (or other designated synchronization device) wakes up at its designated time. As stated above, certain devices or in certain instances, this device may not enter a sleep mode during the superframe 104, and thus would not need to wake up in step 150. Alternatively, the power-insensitive device may otherwise be synchronized prior to this operation.

In a step 152, the sleeping device awakens to receive the synchronization frames. This can be scheduled to occur at the same time the power-insensitive device awakens in step 150, or it can occur shortly thereafter. Preferably, the sleeping device awakens in time to receive and act on the synchronization slots. Alternatively, the awakening of the power-sensitive device can be coordinated as described in the alternative embodiments below.

In a step 154 the power-insensitive device sends the appropriate synchronization signals to the awakening power-sensitive device. For example, the power-insensitive device may send dummy frames or other designated information across the communication channel to assist in synchronization.

In a step 156, the synchronization takes place and the power-sensitive device can conduct its network operation(s) as illustrated by a step 158.

Figure 6:
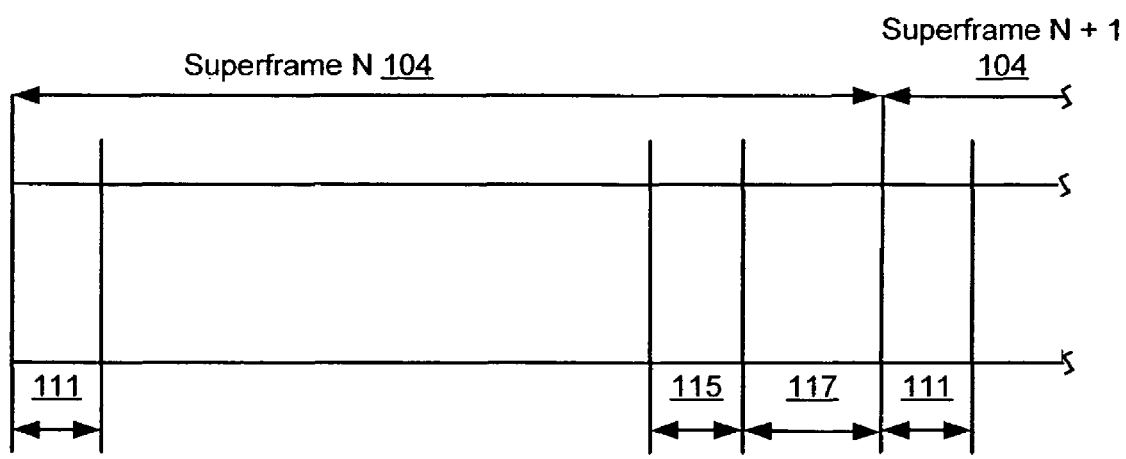
FIG. 6 is a diagram an example frame configuration in accordance with one embodiment of the invention.

FIG. 6 is a diagram illustrating an example implementation of an embodiment wherein a power-sensitive device makes a reservation of slots at the end of the superframe by including not only its own slot(s) but also the one or more slots needed for synchronization with assistance of the power-insensitive device. As shown in the figure below, in this example, an initial reservation made by the power-sensitive device contains one or more slots indicated as 115 (for the power-insensitive device) and one or more slots indicated as 117 (for the power-sensitive device's communication). In this example, the reservation 115 for the power-insensitive device occurs just prior to the reservation 117 for the power-sensitive device, allowing synchronization to occur just prior to the slots 117 in which the power-sensitive device is to communicate across the network. Arranging the synchronization just prior to the communication slot(s) allows the awake time to be reduced over other embodiments. In the illustrated example, these reservations 115, 117 occur at the end of the subject superframe 104, just prior to the next beacon period 111.

The power-sensitive device, through any of a number of techniques (for example, via Application Specific Information Elements, ASIE, of its beacons, which is defined in the WiMedia-MBOA MAC specification) communicates its need for assistance in resynchronization during the 115 to the power-insensitive device. The power-insensitive device can then, for example through MAC procedures, request the power-sensitive device to relinquish the slot designated 115, and take over this reservation.

In accordance with this example embodiment, the power-insensitive and power-sensitive devices have effectively made back-to-back reservations in successive time slots, thereby ensuring that no other device will get in the middle of their reservations by accident. In another embodiment, a more direct way of letting each device make their own reservations can be implemented as well.

Based on this coordination or through other techniques, the two devices have achieved back-to-back reservations in such a way that the power-sensitive device can now count on a slot 115 before its own communication slot 117 to contain useful signals for resynchronization. The power-insensitive device can transmit one or more dummy frames to the power-sensitive device during the synchronization slot 115 enabling the power-sensitive device to synchronize to it prior to the communication slot 117, and get ready for the communication slot 117.

In yet another embodiment, the two devices can use a Private DRP (distributed reservation protocol) reservation to coordinate their slots or other similar technique in alternative environments. A private DRP, as defined in the WiMedia-MAC specifications, is one in which the channel access method and frame exchange sequences are left to the applications running on the devices and may deviate from the standard. As such, in this case, the power-sensitive device may make a reservation containing both synchronization 115 and communication 117 slots. However, the power-sensitive device does not relinquish slot 115 to the power-insensitive device. During the reservation, the power-insensitive device, which knows of the arrangement, makes a transmission of dummy frames during slot 115 to assist the power-sensitive device to wake up, and then the power-sensitive device can take over with its transmissions.

The above embodiments contemplate scenarios wherein the power-sensitive device is the transmitter and makes the reservation. In alternative embodiments, another device can make the reservation. For example, in the cases where the power-sensitive device is the receiver of the communication, it may be desirable to allow the power-insensitive device to make the reservation. In one embodiment, the power-insensitive device makes the reservations (private or regular (Hard)), including an extra slot or slots at the beginning for assisting the power-sensitive device with resynchronization.

The power-insensitive device can then inform the power-sensitive device that the reservation contains a resynchronization slot or slots. This can take place through private handshaking (for example, using the ASIE in the beacon). In this manner, the power-sensitive device knows that the power-insensitive device's real data communication (not dummy frames) does not start on slot 115, but at one of the subsequent slot(s) (for example, slot 117), giving the power-sensitive device time to resynchronize.

In alternative embodiments of the invention, the device does not rely on another device to assist with the synchronization as described above. Instead, in one embodiment, the device determines and makes the reservation for one or more slots (for example, slots 115) prior to (and preferably closest to) the slots reserved for communication (for example, slot 117). In this embodiment, the device wakes up for slot 115 and performs synchronization. This synchronization can be performed with other devices associated with the network. For example, in the case of a WiMedia-MBOA based network, the device can make such a reservation during the Beacon Period and set itself to wake up for this slot 115 and perform the synchronization using communications from other devices on the network.

In one embodiment, the device can be configured to leave its clock (for example, its SYS_CLK) running while turning off its RF (radio frequency) and baseband logic, excluding its SYS_TIME counter and Interrupt controller. Thus, the clock can be used to maintain synchronization with the network meaning resynchronization steps are not needed. Note that not all embodiments calling for synchronization rely expressly on a specified device or a partner device (such as the power-insensitive device in the previous examples) for synchronization. In some embodiments, communications with other network devices in general can be used for synchronization.

It should be noted that in the above embodiments, from time to time synchronization period 115, and communication period 117 are referred to as a slot, or slots. It should be noted that depending on the implementation or on other factors, these periods 115, 117 can comprise one or more than one media access slot(s) 108. In other applications, periods 115, 117 can comprise one or more other time intervals.

While various embodiments of the present invention have been described above, it should be understood that they have been presented by way of example only, and not of limitation. Thus the breadth and scope of the present invention should not be limited by any of the above-described exemplary embodiments. Additionally, the invention is described above in terms of various exemplary embodiments and implementations. It should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," and terms of similar meaning should not be construed as limiting the item described to a given time period or to an item available as of a given time, but instead should be read to encompass conventional, traditional, normal, or standard technologies that may be available now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

What is claimed is:

1. A method of scheduling communications activities for an electronic communication device configured to communicate across a communication network, the network temporally organized into communication windows for network activities, a communication window comprising a scheduling window and a plurality of media access slots for data transmission, the method comprising the steps of:
    a first electronic communication device scheduling a communication activity with second electronic communication device during a scheduling window by reserving a first media access slot;
    the first electronic communication device entering a power-save mode after the scheduling step;
    during a scheduled synchronization period prior to the scheduled communication activity, the first electronic communication device transitioning from the power-save mode into an active state, to perform synchronization with the second electronic communication device to synchronize with the network, wherein the scheduled synchronization period comprises a second media access slot reserved to occur prior to the first media access slot; and
    the first electronic communication device remaining in the active state to conduct the scheduled communication activity.

2. The method of claim 1, wherein the scheduling step is performed such that the communication activity is scheduled to occur toward the end of a communication window.

3. The method of claim 1, wherein the scheduling step is performed such that the communication activity is scheduled to occur in temporal proximity to at least one other network activity.

4. The method of claim 1, further comprising the steps of conducting the scheduled communication activity and transitioning back to the power-save mode after a next communication activity is scheduled.

5. The method of claim 1, further comprising the steps of conducting the scheduled communication activity and transitioning back to the power-save mode at the end of the next communication window.

6. The method of claim wherein the step of scheduling includes a step of scheduling the synchronization period with the second electronic communication device for synchronization with the communication network by reserving the second media access slot, and the method further comprises the steps of:
    the first electronic communication device requesting assistance in synchronization from the second electronic communication device, and
    the first electronic communication device relinquishing the reservation of the scheduled synchronization period to the second electronic communication device to enable the second electronic communication device to communicate information used for resynchronization to the first electronic communication device during the synchronization period.

7. The method of claim 6, wherein the synchronization period and the communication activity are scheduled in successive media access slots if multiple media access slots are available for reservation.

8. The method of claim 6, wherein the first and second electronic communication devices use a distributed reservation protocol reservation to coordinate their slots.

9. The method of claim 1, wherein the step of scheduling further comprises the step of scheduling the synchronization period with the second electronic communication device for synchronization, and the method further comprises the step of the first electronic communication device requesting assistance in resynchronization from the second electronic communication device, wherein the second electronic communication device transmits dummy frames during the synchronization period to assist in synchronization.

10. The method of claim 1, wherein the first and second electronic communication devices communicate regarding resynchronization through private handshaking.

11. The method of claim 1, wherein the power-save mode is at least one of a sleep mode and a deep-sleep mode, and wherein during the power-save mode the first device does not maintain network synchronization.

12. The method of claim 1, wherein the scheduling window is a beacon period.

13. The method of claim 1, wherein the communication window is a superframe.

14. An electronic communication device configured for communication across a communication network, the network temporally organized into communication windows for network activities, a communication window comprising a scheduling window and a plurality of media access slots for data transmission, comprising a non-transitory medium having control logic embodied thereon, the control logic configured to cause the electronic communication device to perform the steps of:

performing a communication activity with a second electronic communication device;
scheduling the communication activity during a scheduling window by reserving a first, media access slot;
entering a power-save mode after the communication activity is scheduled;
during a scheduled synchronization period prior to the scheduled communication activity, transitioning from the power-save mode into an active state, to perform synchronization with the second electronic communication device to synchronize with the network, wherein the scheduled synchronization period comprises a second media access slot reserved to occur prior to the first media access slot; and
remaining in the active state to conduct the scheduled communication activity.

15. The electronic communication device of claim 14, wherein the control logic is further configured to cause the electronic communication device to schedule the communication at the end of a communication window.

16. The electronic communication device of claim 15, wherein the communication window is a superframe.

17. The electronic communication device of claim 14, wherein the control logic is further configured to cause the electronic communication device to schedule the communication in temporal proximity to at least one other network activity.

18. The electronic communication device of claim 14, wherein the control logic comprises at least one of hardware, software and a combination of hardware and software.

19. The electronic communication device of claim 14, wherein the control logic is configured to cause the electronic communication device to transition from the power-save mode for the scheduled communication activity and to transition back to the power-save mode after a next communication activity is scheduled.

20. The electronic communication device of claim 14, wherein the control logic is further configured to cause the electronic communication device to schedule the synchronization period with the second electronic communication device for synchronization with the communication network by reserving the second media access slot, request assistance in synchronization from the second electronic communication device, and relinquish the reservation of the scheduled synchronization period to the second electronic communication device to enable the second electronic communication device to communicate information used for resynchronization to the first electronic communication device during the synchronization period.

21. The electronic communication device of claim 14, wherein the control logic is further configured to cause the electronic communication device to schedule the synchronization period for synchronization with the communication network, request assistance in resynchronization from the second electronic communication device to enable the first electronic communication device to receive dummy frames from the second electronic communication device during the synchronization period to assist in synchronization.

22. The electronic communication device of claim 14, wherein the power-save mode is at least one of a sleep mode and a deep-sleep mode, and wherein during the power-save mode the first device does not maintain network synchronization.

23. In a distributed wireless communication network, a method of scheduling a communication activity for an electronic communication device associated with the network, the network temporally organized into communication windows for network activities, a communication window comprising a scheduling window and a plurality of media access slots, the method comprising the steps of:
a first electronic communication device scheduling a network communication activity for a communication window, the scheduling occurring during the scheduling window associated with that communication window, wherein, media access slots are available for reservation, the communication activity is scheduled to occur in one or more media access slots in temporal proximity to a second scheduling window associated with a second communications window;
the first electronic communication device entering a power-save mode after the communication activity and the second scheduling window; and
the first electronic communication device remaining in the power-save mode until prior to a next scheduled network activity.

24. The method of claim 23, wherein, media access slots are available for reservation, the communication activity is scheduled to occur during the media access slot closest to the end of the communication window; the first electronic communication device enters a power-save mode after the communication activity is scheduled; and the first electronic communication device remains in the power-save mode until prior to the scheduled communication activity.

25. The method of claim 23, wherein the second communication window is the same as the first communication window and, if multiple media access slots are available for reservation, the communication activity is scheduled to occur during the media access slot closest to the beginning of the communication window; the first electronic communication device enters a power-save mode after the communication activity is conducted; and the first electronic communication device remains in the power-save mode until prior to a next scheduling activity.

26. The method of claim 23, wherein the step of scheduling includes a step of the first electronic communication device scheduling one or more media access slots prior to the scheduled communication activity for synchronization of the first electronic communication device with the communication network, and the method further comprises the steps of:
the first electronic communication device requesting assistance in synchronization from a second electronic communication device associated with the communication network, and
the first electronic communication device relinquishing the scheduled synchronization slots to the second electronic communication device to communicate information used for synchronization.

27. The method of claim 26, wherein the synchronization period and the communication activity are scheduled in successive media access slots.

28. The method of claim 26, wherein the first and second electronic communication devices use a distributed reservation protocol reservation to coordinate their slots.

29. The method of claim 23, wherein the step of scheduling includes a step of the first electronic communication device scheduling one or more media access slots prior to the scheduled communication activity for synchronization of the first electronic communication device with the communication network, and the method further comprises the steps of:
the first electronic communication device offering assistance in synchronization to a second electronic communication device associated with the communication network, and the first electronic communication device relinquishing the scheduled synchronization slots to the second electronic communication device to communicate information used for synchronization.

30. The method of claim 23, wherein the step of scheduling further comprises the step of the first electronic communication device scheduling a synchronization period comprising one or more media access slots, and the method further comprises the step of the first electronic communication device requesting assistance in resynchronization from a second electronic communication device associated with the communication network, wherein the second electronic communication device transmits dummy frames during the synchronization period to assist in synchronization.

31. The method of claim 23, wherein the step of scheduling further comprises the step of the first electronic communication device scheduling a synchronization period comprising one or more media access slots, and the method further comprises the step of the first electronic communication device offering assistance in resynchronization to a second electronic communication device associated with the communication network, wherein the second electronic communication device transmits dummy frames during the synchronization period to assist in synchronization.

32. In a distributed wireless communication network, a method of scheduling a communication activity for an electronic communication device associated with the network, the network temporally organized into superframes for network activities, a superframe comprising a scheduling window and a plurality of media access slots, the method comprising the steps of:

a first electronic communication device reserving a network communication activity time slot comprising one or more media access slots during a superframe, the reservation made on behalf of a second electronic communication device, the first electronic communication device communicating information regarding the reservation to the second electronic communication device; and the reservation including a reservation of one or more additional media access slots for the second electronic communication device to transmit information for device synchronization to the first electronic communication device.

33. The method of claim 32, wherein the reservation is communicated through handshaking between the first and second electronic communication devices.

* * * * *